United States Patent Office 3,843,333
Patented Oct. 22, 1974

3,843,333
ALUMINUM BRAZING SHEET
Ralph A. Woods, Pleasanton, Calif., assignor to Kaiser Aluminum & Chemical Corporation, Oakland, Calif.
No Drawing. Filed Aug. 31, 1973, Ser. No. 393,461
Int. Cl. B23p 3/00
U.S. Cl. 29—191                                6 Claims

ABSTRACT OF THE DISCLOSURE

This invention relates to an improved aluminum brazing sheet wherein substantially all of the silicon particles in the high silicon cladding are less than 7 microns in maximum dimension.

Background of the Invention

The present invention relates to an improved clad aluminum brazing sheet which is particularly suitable for the dip brazing of aluminum products.

Conventional brazing sheet generally comprises a high melting point aluminum alloy core clad on one or both sides with a low melting point, high silicon aluminum alloy. Suitable aluminum core alloys include 6951 and 3003 and suitable low melting cladding alloys include 4343 alloy and 4045 alloy (Aluminum Association designations). The compositions of the aforesaid alloys are set forth in the table below (all composition percentages set forth herein are percent by weight).

| Alloy | Alloy composition | | | | | | | |
|-------|------|-----|--------|---------|------|-----|-----|----------|
|       | Si   | Fe  | Cu     | Mn      | Mg   | Zn  | Ti  | Al       |
| 3003  | .6   | .7  | .05–.20| 1.0–1.5 |      | .1  |     | Balance. |
| 6951  | .2–.5| .8  | .15–.40| .1      | .4–.8| .2  |     | Do.      |
| 4343  | 6.8–8.2| .8| .25   | .1      |      | .2  |     | Do.      |
| 4045  | 9.0–11.0| .8| .30  | .05     | .05  | .1  | .2  | Do.      |

The cladding thickness on each side usually varies from about 2–20% of the total composite thickness with the thinner composite material generally having a higher cladding thickness percentage. The brazing sheet is prepared by normal conventional roll bonding techniques.

In dip brazing processes, a brazing sheet is assembled into the desired configuration with an aluminum product and the assembly is then placed into a molten salt bath for a few seconds up to several minutes so as to heat up the assembly and cause the high silicon aluminum alloy cladding to melt and form a fillet with the aluminum product to be brazed. The assembly is removed from the bath to solidify the just-formed fillet and then rinsed with water and the like to remove any solidified salt bath from the brazed assembly. The molten salt flux assists in lifting any aluminum oxide on the surface of the aluminum materials, thus allowing the high silicon alloy to flow under the oxide and wet the clean or nascent aluminum surfaces. Operating temperatures of the bath generally range from about 1050–1150° F., usually about 1130° F. The salt bath can vary greatly in both chemical content and concentration. Most proprietary products are usually alkali and alkaline earth chlorides and fluorides. Suitable salts include sodium, potassium, calcium, zinc and lithium salts.

Generally, the flowability at brazing temperatures of the high silicon cladding material increases as the silicon level increases; however, attendant with the improved flowability is an increase in the brittleness of the subsequent brazement due to the formation of coarse, silicon-rich particles.

Against this background, the present invention was developed.

Description of the Invention

The present invention relates to an improved clad aluminum brazing sheet which is particularly suitable for the dip brazing of aluminum products. The sheet product of the present invention comprises a core of a relatively high melting point aluminum alloy clad with a relatively low melting point aluminum-silicon alloy. In accordance with the present invention, substantially all of the silicon-rich particles in the cladding are less than 7 microns in maximum dimension, and with the majority of particles ranging from about 0.5–5 microns in size. This silicon structure is modified from that found in commercially available brazing sheet because in the latter, substantially all of the silicon-rich particles lie in the range of 5–15 microns in maximum dimension with the majority of the particles being above 7 microns.

This finer silicon structure in the cladding material of the present invention significantly increases the flowability of the cladding at brazing temperatures, thus significantly improving the brazing characteristics of the cladding without detrimentally affecting the resultant brazing sheet. Brazing times can be considerably reduced and significant reductions can be made in the temperature of the molten salt bath.

The core of the brazing sheet of the present invention can be of any suitable aluminum alloy having a high melting point, i.e., above about 1150° F. Suitable alloys include those aluminum alloys conventionally used for core material in clad brazing sheet products, such as 6951, 3003 and the like. The core alloy may consist essentially of about up to 1.5% silicon, up to 2.5% magnesium, up to 0.8% iron, up to 0.25% copper, up to 0.20% zinc, up to 1.5% by weight manganese, other elements up to 0.10% each and the balance essentially aluminum. The cladding alloy is an aluminum alloy consisting essentially of about 5–13% silicon, up to 0.5% magnesium (from about 0.4–3.0% for vacuum brazing sheet), up to 0.8% iron, up to 0.25% copper, up to 0.20% zinc, up to 0.20% manganese, other elements up to 0.10% each and the balance essentially aluminum. The silicon levels preferably are 7.5% and 10%. The aforesaid modified silicon structure of the present invention can be obtained by adding to the cladding alloy from about 0.005 to 0.07%, preferably 0.005 to 0.03% of elements selected from the group consisting of sodium, potassium, calcium, strontium and combinations thereof. The same amounts of arsenic, phosphorus and barium can also be employed. These elements act in a manner similar to that of sodium in cast products insofar as these elements reduce the size of the silicon-rich particles. However, the sodium modified silicon particles in cast products are considerably larger than those contemplated in the present invention.

As is well known by those skilled in the art, care must be exercised in introducing sodium into a body of molten aluminum so as to minimize the evaporation and/or burning of the sodium or other additives. Normally, casting occurs quickly after the introduction and dispersion of the sodium or other additive elements into the molten metal. Under some circumstances, it may be more convenient to employ salts of these metals although it has been conventional practice in cast products to add metallic sodium to the melt to modify the silicon structure.

Another method of promoting the finer silicon structure, as herein described, is to cast the high silicon aluminum alloy in such a manner as to impose a rapid solidification on the alloy, thereby maintaining the size of the silicon-rich particles to less than 7 microns in maximum dimension in the final product. Some size reduction of the silicon occurs during rolling or other forming operations, but this has a relatively minor effect on the final size of the silicon-rich particles in comparison with adding sodium or the like or controlling the casting to effect a very rapid quench.

The present brazing sheet can be clad with the high silicon cladding alloy on one or both sides of the core member with the thickness of the cladding ranging from about 2–20%, preferably 3–10%, of the total composite thickness. The brazing sheet of the present invention can be formed by the same conventional roll bonding techniques which are employed in making the prior art brazing sheet products.

To further illustrate the advantages of the present invention, the following example is provided.

No. 12 brazing sheet and brazing sheet in accordance with the present invention were prepared having a core of 3003 alloy and cladding having the following cladding compositions:

|    | Invention | No. 12  |
|----|-----------|---------|
| Si | 7.62      | 7.67    |
| Fe | 0.11      | 0.11    |
| Cu | 0.04      | 0.04    |
| Mn | 0.02      | 0.02    |
| Mg | 0.003     | 0.003   |
| Cr | 0.00      | 0.00    |
| Zn | 0.01      | 0.01    |
| Ti | 0.002     | 0.002   |
| Na | 0.01      | 0.00    |
| Al | Balance   | Balance |

Both sheets were 0.020 inch thick and the cladding was 10%. Under microscopic examination, the silicon particles in the cladding of the invention were essentially all below 7 microns in maximum dimension. Inverted T-joints were assembled with samples from each of the brazing sheets, the vertical member being the brazing sheet and the horizontal member being a sheet of 0.040 inch thick 1100 aluminum alloy.

Several assemblies with both the brazing sheet of the invention and No. 12 brazing sheet were dipped in a molten salt bath maintained at a temperature of about 1130° F. and then withdrawn from the bath after various times to be able to compare the filleting of the two types of brazing sheet over various periods of time. In all instances, the filleting was more complete with the brazing sheet of the invention. For example, the T-joint with the present invention after one minute in the bath had the same fillet size as the T-joint with the No. 12 brazing sheet which had been left in the bath two minutes. The quality of both brazements was excellent.

In a second series of tests, employing inverted T-joints described above, in baths at different temperatures, it was found that the fillets formed with the brazing sheet of the present invention at a particular temperature were the same size as those formed with the No. 12 brazing sheet at a bath temperature from 20 to 30° F. higher.

Although the above discussion of the present invention is primarily directed to an embodiment useful in the dip brazing of aluminum products, the invention is fully applicable to brazing sheet in general and can be employed in vacuum brazing sheet wherein the cladding contains significant amounts of magnesium, i.e., up to about 3% magnesium.

It is obvious that various modifications and improvements can be made to the present invention without departing from the spirit of the invention and the scope of the appended claims.

What is claimed is:

1. A clad aluminum brazing sheet comprising a relatively high melting point aluminum alloy core and clad to said core a relatively low melting point aluminum alloy consisting essentially of 5–13% silicon, up to 3% magnesium, 0.8% maximum iron, 0.25% maximum manganese, 0.25% maximum copper, 0.20% maximum zinc, 0.10% maximum other elements each and the balance aluminum, said low melting point alloy cladding characterized by substantially all of the silicon particles being less than 7 microns in maximum dimension and a majority of the silicon existing as particles from about 0.5 to 5.0 microns in maximum dimension.

2. The brazing sheet of claim 1 wherein said low melting point alloy contains from about 0.005 to about 0.07% of at least one element selected from the group consisting of sodium, potassium, calcium and strontium.

3. The brazing sheet of claim 1 wherein the cladding thickness on one side of the brazing sheet ranges from about 2 to 20% of the total brazing sheet thickness.

4. The brazing sheet of claim 2 wherein said low melting point alloy contains from about 0.005 to 0.03% of at least one element selected from the group consisting of sodium, potassium, calcium and strontium.

5. The brazing sheet of claim 1 wherein said core alloy has a melting point above 1150° F.

6. A method of brazing an aluminum product comprising assembling said aluminum product into a desired configuration with aluminum brazing sheet comprising a relatively high melting point aluminum alloy core and clad to said core a relatively low melting point aluminum alloy consisting essentially of 5–13% silicon, up to 3% magnesium, 0.8% maximum iron, 0.25% maximum manganese, 0.25% maximum copper, 0.20% maximum zinc, 0.10% maximum other elements each and the balance aluminum, said low melting point alloy cladding characterized by substantially all of the silicon particles being less than 7 microns in maximum dimension and a majority of the silicon existing as particles from about 0.5 to 5.0 microns in maximum dimension and heating the assembly to brazing temperatures to cause the cladding to melt and form a fillet with said aluminum product.

References Cited

UNITED STATES PATENTS

| 1,657,389 | 4/1928  | Gwyer et al. | 75—148   |
|-----------|---------|--------------|----------|
| 2,013,926 | 9/1935  | Pacz         | 75—68    |
| 3,384,951 | 5/1968  | Binger       | 29—197.5 |
| 3,471,286 | 10/1969 | Strong et al.| 75—148   |

FOREIGN PATENTS

| 1,328,642 | 8/1973 | Great Britain | 29—19 |

WINSTON A. DOUGLAS, Primary Examiner